UNITED STATES PATENT OFFICE.

JOHN COLLINS CLANCY, OF NEW YORK, N. Y., ASSIGNOR TO CLANCY METALS PROCESS COMPANY, OF NEW YORK, N. Y., A CORPORATION OF NEW YORK.

TREATMENT OF COPPER ORES BEARING PRECIOUS METALS.

1,057,936.   Specification of Letters Patent.   Patented Apr. 1, 1913.

No Drawing.   Application filed September 9, 1911.   Serial No. 648,557.

*To all whom it may concern:*

Be it known that I, JOHN COLLINS CLANCY, a subject of the King of Great Britain, having declared my intention of becoming a citizen of the United States, at present residing at New York city, borough of Manhattan, in the county of New York and State of New York, have invented certain new and useful Improvements in the Treatment of Copper Ores Bearing Precious Metals, of which the following is a specification.

My invention relates to novel methods of treating copper ores bearing the precious metals, which methods are particularly described and pointed out in the following specification and claims.

I have discovered that the precious metals can be extracted from cupriferous ores by the treatment of such ores with a cyanid solution containing a cyanamid. The addition of a cyanamid prevents the copper from consuming the cyanid, that is to say, the function of the cyanamid being to form an insoluble compound with the copper, the copper cyanamid compound so formed is soluble in the excess of cyanid without destroying the cyanid solution. The cyanid solution can at any time be regenerated and used as a solvent by precipitating the copper from the solution.

My discovery includes the very astounding fact, that when copper ore or a copper compound is dissolved by a cyanid solution containing a cyanamid, the copper is not precipitated by any form of metallic zinc or other electro-positive metal while the precious metals are precipitated by the zinc to the exclusion of the baser metal. It is therefore obvious that the cyanid cyanamid solution may be used over and over again as a precious metal solvent, before or after precipitating out its copper contents.

The destructive action of copper compounds upon cyanid solutions may be shown, by taking for example, the action of cyanid upon copper carbonate:

$$2CuCO_3 + 7KCN + 2KOH = Cu_2(CN)_2 + 4KCN + KCNO + K_2CO_3 + H_2O$$

Now, when cyanamid is present in the cyanid solution the cyanamid immediately forms copper cyanamid and this copper cyanamid is dissolved by the excess of cyanid so that no cyanate is allowed to form. This reaction probably takes place after the following equations:

$$nCuCN_2 + nKCN = (nCuCN_2 nKCN)$$

The last complex compound is a solvent for the precious metals and copper compounds. The compound $(nCuCN_2 nKCN)$ gives up all its KCN on addition of ammonia or an ammonia salt, such, for example, an $NH_4Cl$ behaving exactly as a double cyanid of copper and ammonia, that is, liberates CN and the cuprammonium ion $Cu(NH_3)_4$.

By simple electrolysis of $nCuCN_2 nKCN$ all of the cyanid may be regenerated at a very slight expenditure of current, due to the fact that I discovered that copper is first precipitated on the anode as a black copper cyanamid. This copper cyanamid behaves practically as a copper anode and very little voltage is sufficient to transfer the anodic copper to the cathode, during which transfer regeneration of the cyanid takes place. The presence of sulfocyanid in the solution acts as an auxiliary to the regeneration of cyanid. In the treatment of copper sulfid ores the process works as advantageously as in the treatment of oxidized copper ores.

It may be stated that a high current density may be used in the deposition of the copper from this solution without destroying the solution and at the same time cutting down the expense of large installation for electrolyzers in the copper deposition.

One way of carrying my invention into practice is to treat the ore in the pulverized condition with an alkaline cyanid solution, as for example, potassium or sodium cyanid, and a cyanamid such, for example, as calcium cyanamid. Different ores require different strengths of solution employed and these must be ascertained by preliminary tests. In practice with certain ores I have found the following proportion to answer well the purpose of the process: 2,000 pounds of pulverized ore is suspended in a solution of two pounds sodium cyanid, two pounds calcium cyanamid and two pounds lime in 2,000 pounds of water. The whole mixture which is in the proportion of substantially one part of said solution to one part of ore is placed in an agitating tank. The mixture of ore and solution is continuously agitated for a period of from eight to twelve hours, or until extraction is complete, when the pregnant solution is separated from the ore. The ore is washed free from the pregnant solution by displacement, and the solution is passed over zinc shavings or dust to precipitate its precious metal contents while the copper is held in solution by reason of the cyanamid. This solution is used over and over again or, if thought necessary, passed through an electrolyzer to precipitate its copper contents. The percentage of copper in the solution will determine when the solution is ready to be robbed of its copper contents. However, this copper cyanamid solution is an excellent solvent for the precious metals as well as for copper compounds.

Having thus described my invention and examples of different ways of carrying it into effect, it will be understood that various modifications and changes in the described processes may be made and equivalent substances may be employed without departing from the spirit of my invention and without exceeding the scope of my claims.

What I claim and desire to secure by Letters Patent of the United States is:—

1. The process of treating copper ores which consists of subjecting the ore to the action of a cyanid solution containing a soluble cyanamid.

2. The process of treating copper ores containing precious metals which consists in subjecting the ore to the action of a cyanid solution containing a soluble cyanamid.

3. The process of treating copper cyanid solutions containing precious metals which consists in the addition of a cyanamid to the said solution for the purpose of retaining the copper in solution while the precious metals are precipitated by zinc or nascent hydrogen to the exclusion of the baser metal.

4. The process of treating copper ores containing precious metals, which consists in subjecting the ore to the action of a cyanid solution containing a soluble cyanamid, and electrolyzing the solution for the recovery of the copper.

In testimony whereof I have hereunto signed my name in the presence of two subscribing witnesses.

JOHN COLLINS CLANCY.

Witnesses:
M. E. McNinch,
E. M. Lockwood.